United States Patent [19]
Hill, Jr. et al.

[11] 3,959,568
[45] May 25, 1976

[54] α-ALKOXYSTYRENE RESINOUS ADHESIVES AND LAMINATES

[75] Inventors: Harold Wayne Hill, Jr.; Charles W. Moberly, both of Bartlesville, Okla.

[73] Assignee: Phillips Petroleum Company, Bartlesville, Okla.

[22] Filed: June 25, 1974

[21] Appl. No.: 482,879

Related U.S. Application Data

[62] Division of Ser. No. 290,313, Sept. 19, 1972, Pat. No. 3,846,511.

[52] U.S. Cl. ............... 428/462; 156/331; 156/334; 260/879; 260/880 R; 428/463; 428/473; 428/511; 428/519; 428/520
[51] Int. Cl.² ................................. B32B 15/08
[58] Field of Search .............. 260/880 R; 161/217, 161/218, 255, 256; 156/331, 334; 117/132 CB, 161 UZ, 161 UD, 161 UN, 162, 880 R, 880 B, 879; 428/462, 463, 519, 520

[56] References Cited
UNITED STATES PATENTS

| | | | |
|---|---|---|---|
| 2,783,166 | 2/1957 | Deanin | 117/132 CB |
| 3,239,478 | 3/1966 | Harlan | 260/27 |
| 3,328,488 | 6/1967 | Delacretaz et al. | 260/880 R |
| 3,436,440 | 4/1969 | Abe et al. | 260/29.7 UA |
| 3,617,364 | 11/1971 | Jarema et al. | 117/132 B |
| 3,641,209 | 2/1972 | Ott et al. | 260/880 R |
| 3,751,524 | 8/1973 | Haigh et al. | 260/880 R |
| 3,826,709 | 7/1974 | Humphries | 161/217 |

*Primary Examiner*—George F. Lesmes
*Assistant Examiner*—R. J. Roche

[57] ABSTRACT

Resinous graft copolymers useful in adhesive formulations are prepared by polymerization of an alkoxystyrene with an olefinically unsaturated nitrile in a solution or dispersion of a rubber. The polymeric compositions can be applied to surfaces as a hot melt adhesive or solvent cement. Laminates formed with the resinous graft copolymers exhibit substantial lap shear strength.

11 Claims, No Drawings

α-ALKOXYSTYRENE RESINOUS ADHESIVES AND LAMINATES

This is a divisional application of our copending application having Ser. No. 290,313, filed Sept. 19, 1972, now U.S. Pat. No. 3,846,511.

This invention relates to a copolymerization process and to the resulting polymeric products which are useful as adhesive compositions. In accordance with another aspect, this invention relates to adhesive compositions and to structures having surfaces adhesively joined together therewith. In accordance with another aspect, this invention relates to a process for the preparation of graft copolymers by copolymerizing an alpha-alkoxystyrene and acrylonitrile and/or methacrylonitrile in a solution or dispersion of a rubber. In accordance with another aspect, this invention relates to a graft copolymer produced from an alkoxystyrene, an olefinically unsaturated nitrile, and rubber. In accordance with a further aspect, this invention relates to utilization of a graft copolymer produced according to the invention as adhesives for bonding various structures together.

Accordingly, an object of this invention is to provide an improved process for the production of graft copolymers.

Another object of this invention is to provide a process for the copolymerization of monomers onto rubber to produce adhesive compositions.

Another object of this invention is to provide adhesive compositions which display excellent properties of stability and resistance to degradation.

A further object of this invention is to provide adhesive compositions which are characterized by their ability to adhere to a wide variety of substrates.

A still further object of this invention is to provide a proces for bonding metal substrates together.

Other objects and aspects, as well as the several advantages of the invention, will be apparent to those skilled in the art upon reading the specification and the appended claims.

In accordance with the invention, resinous compositions useful as adhesives and other applications are produced by polymerization of an alpha-alkoxystyrene with an olefinically unsaturated nitrile in a solution or dispersion of a rubber.

In accordance with one specific embodiment of the invention, alpha-methoxystyrene is copolymerized with acrylonitrile and/or methacrylonitrile in a solution or dispersion of a butadiene-styrene rubber in the presence of a polymerization initiator.

The alpha-alkoxystyrene for use in this invention can be represented by the formula

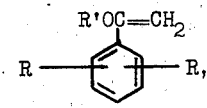

wherein each R is selected from hydrogen, methyl, and ethyl, and R' is an alkyl radical having 1 to 6 carbon atoms. Examples of suitable alpha-alkoxystyrenes include alpha-methoxystyrene, alpha-ethoxystyrene, alpha-isopropoxystyrene, alpha-butoxy-2-methylstyrene, alpha-propoxy-2-ethyl-5-methylstyrene, alpha-hexoxy-3,4-diethylstyrene, and the like, and mixtures thereof.

The alpha, beta-unsaturated nitriles that can be copolymerized along with the alpha-alkoxystyrenes defined above include acrylonitrile and methacrylonitrile. If desired, a mixture of acrylonitrile and methacrylonitrile can be employed.

Although the rubber for use in this invention can be any synthetic or natural rubber, the rubber preferably is one produced synthetically. Examples of some suitable synthetic rubbers include polybutadiene, polyisoprene, neoprene, and copolymers of butadiene or isoprene with acrylonitrile or with styrene or other vinyl-substituted aromatic hydrocarbon. The copolymers used can be random, block, or branched block copolymer. If desired, a small amount of a divinyl-substituted aromatic hydrocarbon can be used in preparing the rubber. Additionally, mixtures of rubbers can be employed.

In order that the resins of this invention will have the most desirable balance of properties, 20 to 45 weight percent, preferably 25 to 35 weight percent, of the resin should be derived from the rubber; 35 to 50 weight percent, preferably 40 to 45 weight percent, of the resin should be derived from the alpha-alkoxystyrene; and 20 to 35 weight percent, preferably 25 to 30 weight percent, of the resin should be derived from acrylonitrile or methacrylonitrile. However, in view of the lower reactivity of the alpha-alkoxystyrene as contrasted with the acrylonitrile or methacrylonitrile, it is sometimes beneficial to charge to the reactor a somewhat higher ratio of alpha-alkoxystyrene to acrylonitrile or methacrylonitrile. Generally, based on the total weight of rubber, alpha-alkoxystyrene, and acrylonitrile or methacrylonitrile charged to the reactor, 15 to 35 weight percent, preferably 20 to 30 weight percent, of the charge will be rubber; 45 to 65 weight percent, preferably 50 to 60 weight percent, of the charge will be alpha-alkoxystyrene; and 15 to 30 weight percent, preferably 20 to 25 weight percent, of the charge will be acrylonitrile or methacrylonitrile.

The polymerization process of this invention is desirably conducted in a solution or emulsion polymerization system. When an emulsion polymerization system is used, the system can be either an oil-in-oil emulsion or oil-in-water emulsion. In any of these polymerization systems there should be present a free radical initiator such as those well known in the art. Examples of such free radical initiators include azobisisobutyronitrile, benzoyl peroxide, isopropyl peroxydicarbonate, potassium persulfate, redox systems, e.g., potassium persulfate-sodium bisulfite, and the like. Water-soluble initiators are preferred for use in oil-in-water emulsions. Oil-soluble initiators are preferred for use in solution or oil-in-oil emulsion polymerization systems. Although the amount of initiator employed can be varied over a wide range, the initiator is generally employed in an amount of about 0.01 to about 10, preferably about 0.2 to about 5, parts by weight per 100 parts by weight of monomers, i.e., alpha-alkoxystyrene and acrylonitrile or methacrylonitrile.

Although the temperature at which the polymerization is conducted can vary over a considerable range, the temperature generally will be within the range of about 0°C to about 100°C, preferably about 30°C to about 80°C. The polymerization time also can vary over a considerable range, depending in part on the polymerization temperature, but generally will be within the range of about 30 minutes to about 48 hours, preferably about 10 hours to about 30 hours. The pressure need be only sufficient to maintain the monomers and solvent or diluent substantially in the liquid phase, e.g., about 0 psig to about 50 psig. When the polymerization is conducted in a solution or oil-in-oil emulsion polymerization system, conventional organic solvents inert to the reactants can be employed. Examples of suitable organic solvents include saturated aliphatic, saturated cycloaliphatic, and aromatic hydrocarbons such as cyclohexane, methylcyclohexane, methylcyclopentane, hexane, heptane, 2,2,4-trimethylpentane, 2,2-dimethylbutane, benzene, toluene, and xylenes, and ethers such as tetrahydrofuran and dioxane. Mixtures of such solvents can be employed. Water, of course, is employed in the oil-in-water emulsion polymerization systems.

In actual operation the graft copolymers of the invention are prepared by forming a solution or suspension of the rubber and the alpha-alkoxystyrene and acrylonitrile and methacrylonitrile monomers and polymerization initiator are added to the solution or suspension of rubber, and then the polymerization is allowed to proceed. The reaction mixture is generally stirred and maintained at a constant temperature. After polymerization, the total polymeric product is precipitated and the product graft copolymer separated from the solvent and unreacted material, usually on the basis of solubility. Any known technique for the separation of polymeric products can be used for recovery of the product of the invention.

The resinous products of the invention can be employed as adhesives and are especially useful as hot melt adhesives which can be employed in conventional manner, e.g., application by an extrusion technique in which the molten polymer is allowed to flow on or between substrates to be bonded or by application as a preformed film between substrates which are subjected to heating. The graft copolymers employed as adhesives in this invention also can be used as solvent cements in which the polymers dissolved in a suitable solvent are applied to substrates in conventional manner with a bond produced as the solvent evaporates or with solvent evaporation followed by a thermal bond-forming operation. If desired, other substances known to have utility in adhesive formulations, e.g., resins such as olefin resins or terpene resins, waxes, plasticizers, fillers, pigments, and the like, can be present in the adhesive composition. The adhesive can be used to bond a variety of like or unlike substrates, e.g., metal such as aluminum, iron, steel, e.g., carbon steel, zinc, or tin; wood; paper; leather; plastics; and the like.

Although the resins of this invention are particularly useful as hot melt adhesives or solvent cements, they are also useful as antistatic agents for polyolefin fibers and films and for polystyrene plastics. Furthermore, they are of value in forming films and other molded shapes. If desired, additives or other components commonly used in such compositions can be present.

EXAMPLE I

Resins were prepared by copolymerizing alpha-methoxystyrene and acrylonitrile in the presence of a rubbery polymer. Solprene* 1205 rubber, a butadiene/styrene block copolymer with a 75/25, respectively, parts by weight composition and a Mooney viscosity of 47 ML-4 at 212°F (ASTM D 1646-63) as the rubbery component, was dissolved in cyclohexane in the amounts shown in Table I. In Runs 1, 2, and 3, respectively, 1.90, 3.75, and 6.25 grams of Solprene* 1205 rubber were dissolved in 75 milliliters of cyclohexane in 10-ounce bottles. After addition of rubber and solvent the bottles were sealed with extracted rubber gaskets and perforated crown caps. The bottles were alternately evacuated and pressured with nitrogen through a hypodermic needle extending through the gasket to provide a nitrogen atmosphere in the bottles. The bottles were tumbled in a polymerization bath containing water as the heat transfer medium at 70°C until the rubber was dissolved. The bottles were removed from the bath, uncapped, and 9.0 grams alpha-methoxystyrene, 3.5 grams acrylonitrile, and 0.25 gram azobisisobutyronitrile were added to each bottle. The bottles were flushed as before with nitrogen and replaced in the polymerization bath for 5.5 hours at 70°C. The bottles were removed from the bath, and 0.25 gram azobisisobutyronitrile was added to each opened bottle, which was again purged of air with nitrogen. Polymerization was continued for 18.5 hours for a total of 24 hours by tumbling the bottles at 70°C. As the polymerization proceeded, the reaction medium took on the appearance of a latex, and the final products in the bottles were relatively fluid liquids with the appearance of latex. The contents of each bottle were poured into methanol to precipitate the resin. The resin was filtered out on a fluted paper and chopped in a Waring blendor in methanol, filtered to collect the product, and dried in a vacuum oven at about 150°F (66°C). The products weighed 10.8, 12.7, and 15.5 grams, respectively, which correspond to conversions of the monomers, assuming complete recovery of the rubber charged, of 71, 72, and 74 weight percent. The weight percentage of Solprene* 1205 rubber incorporated in the products were calculated to be 18, 29, and 40.

*A Phillips Petroleum Company Trademark

EXAMPLE II

To test the resinous products as potential components of hot melt adhesives, films of the products were melted between aluminum coupons, and lap shear strength values were obtained, the values being compared with those of other resins. Films of approximately 10 mils thickness were pressed between plates at 350°F (177°C) for the experimental resins, and Cyclolac TD-1001, a commercial ABS (acrylonitrile/butadiene/styrene) resin. A section of the film of each was placed between one-inch wide aluminum strips held in a jig to produce a 1-inch overlap of the strips with the melted resin sandwiched between. Solprene* 411 rubber, a branched block 70/30 (by weight) butadiene/styrene copolymer, and neoprene rubber are shown in comparative lap shear strength test. For these rubbery polymers, the aluminum coupons with polymers sandwiched between were prepared by applying rubber cement, a solution of the rubber, to each aluminum strip, evaporating the solvent to leave the strip coated with rubber, and bonding the strips together held in a jig in a press at 350°F (177°C). The values for lap shear strength were determined by placing the aluminum strips in the jaws of an Instron tester and pulling them apart to obtain values for lap shear strength in pounds per square inch as shown in Table I.

TABLE I

| Run | 1 | 2 | 3 |
|---|---|---|---|
| Solprene* 1205 rubber, g | 1.90 | 3.75 | 6.25 |
| Cyclohexane, ml | 75 | 75 | 75 |
| alpha-Methoxystyrene, g | 9.0 | 9.0 | 9.0 |
| Acrylonitrile, g | 3.5 | 3.5 | 3.5 |
| Azobisisobutyronitrile, g[a] | 0.5 | 0.5 | 0.5 |
| Yield, g | 10.8 | 12.7 | 15.5 |
| Conversion of Monomers, % | 71 | 72 | 74 |

TABLE I-continued

| Run | 1 | 2 | 3 |
|---|---|---|---|
| Rubber-derived content of resin, wt.% | 18 | 29 | 40 |
| alpha-Methoxystyrene-derived units, wt. % | 50 | 43 | 37 |
| Acrylonitrile-derived units, wt.% | 32 | 28 | 23 |

| Product | Lap Shear Test Lap Shear Strength, psi[c] |
|---|---|
| Product of Run 1 | Too brittle |
| Product of Run 2 | 592 |
| Product of Run 3 | 262 |
| Cyclolac TD-1001 ABS resin | 318 |
| Solprene* 411 rubber | 481 |
| Neoprene rubber | 363 |

[a] 0.25 gram added at beginning and 0.25 gram added after 5.5 hours.
[b] In 24 hours total polymerization time at 70°C.
[c] ASTM D 1002-64.

As shown in Table I, the resins produced in Runs 2 and 3 exhibited substantial lap shear strength. In fact, the resin produced in Run 2 exhibited higher lap shear strength than did the ABS resin, the Solprene* 411 rubber, or the neoprene rubber, each of which is useful in hot melt adhesive compositions. The resin produced in Run 1, in which insufficient rubber was employed, was too brittle.

*Phillips Petroleum Company Trademark

We claim:

1. A plurality of layers having, between adjacent surfaces thereof as a bonding material therefor, a resinous graft copolymer product produced by copolymerizing (a) an alpha-alkoxystyrene represented by the formula

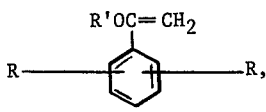

wherein each R is selected from hydrogen, methyl, and ethyl, and R' is an alkyl radical having 1 to 6 carbon atoms, and (b) acrylonitrile and/or methacrylonitrile in (c) a solution or liquid suspension of a synthetic rubber prepared by polymerization of conjugated dienes or copolymerization of conjugated dienes with another monomer in the presence of a free radical polymerization initiator wherein the amount of ingredients in the resinous copolymer product are 20–45 weight percent of the resin derived from rubber, 35–50 weight percent of the resin derived from alpha-alkoxystyrene, and 20–35 weight percent of the resin derived from acrylonitrile and/or methacrylonitrile.

2. A laminate according to claim 1 wherein the amount of ingredients in the resinous copolymer product are 25–35 weight percent of the resin derived from rubber, 40–45 weight percent of the resin derived from alpha-alkoxystyrene, and 25–30 weight percent of the resin derived from acrylonitrile and/or methacrylonitrile.

3. A laminate according to claim 1 wherein the rubber is a butadienestyrene block copolymer.

4. A laminate according to claim 1 wherein the rubber is a polymer of a conjugated diene, the alpha-alkoxystyrene is alpha-methoxystyrene, and the third component is acrylonitrile.

5. An article of manufacture according to claim 1 wherein the layers are metal, plastic, wood, paper, or leather.

6. A laminate according to claim 4 wherein the polymer of a conjugated diene is a butadiene-styrene copolymer.

7. A laminate according to claim 5 wherein the resinous graft copolymer product is produced from a butadiene-styrene block copolymer, alphamethoxystyrene, and acrylonitrile.

8. A process for uniting surfaces of elements which comprises
   applying to at least one of said surfaces a resinous graft copolymer product produced by copolymerizing (a) an alpha-alkoxystyrene represented by the formula

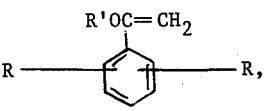

wherein each R is selected from hydrogen, methyl, and ethyl, and R' is an alkyl radical having 1 to 6 carbon atoms, and (b) acrylonitrile and/or methacrylonitrile in (c) a solution or liquid suspension of a synthetic rubber prepared by polymerization of conjugated dienes or copolymerization of conjugated dienes with another monomer in the presence of a free radical polymerization initiator wherein the amount of ingredients in the resinous copolymer product are 20–45 weight percent of the resin derived from rubber, 35–50 weight percent of the resin derived from alpha-alkoxystyrene, and 20–35 weight percent of the resin derived from acrylonitrile and/or methacrylonitrile,
   holding said surfaces contiguous to one another with said polymeric composition disposed therebetween, and
   allowing said composition to bond to said surfaces and form a structure having good lap shear strength.

9. A process according to claim 8 wherein the layers are metal, plastic, wood, paper, or leather.

10. A process according to claim 8 wherein said resinous graft copolymer is a product of a polymer of butadiene, alpha-methoxystyrene, and acrylonitrile.

11. A process according to claim 10 wherein said polymer of butadiene is a butadiene-styrene block copolymer.

* * * * *